Feb. 23, 1954   C. N. BEBINGER   2,670,073
APPARATUS FOR THE LOADING OF SHAKER CONVEYERS
Filed Feb. 25, 1947   6 Sheets-Sheet 1

Inventor:
Charles N. Bebinger.
by
Atty.

Feb. 23, 1954  C. N. BEBINGER  2,670,073
APPARATUS FOR THE LOADING OF SHAKER CONVEYERS
Filed Feb. 25, 1947

Inventor.
Charles N. Bebinger
by Louis A. Maxson
Atty.

Patented Feb. 23, 1954

2,670,073

UNITED STATES PATENT OFFICE 2,670,073

APPARATUS FOR THE LOADING OF SHAKER CONVEYERS

Charles Newton Bebinger, New Philadelphia, Ohio, assignor to Joy Manufacturing Company, a corporation of Pennsylvania Application February 25, 1947, Serial No. 730,671

25 Claims. (Cl. 198—220)

My invention relates to apparatus for the loading of shaker conveyors and, more particularly, to apparatus for collecting shot coal or the like and depositing it on a shaker conveyor.

An object of my invention is to provide an improved shaker conveyor loading apparatus. Another object of my invention is to provide an improved apparatus for gathering material from a mine floor and depositing it on a shaker conveyor line embodying improved means for effecting the feeding and retraction thereof. A further object of my invention is to provide an improved shaker conveyor loading apparatus having an improved hydraulically controlled mechanism for effecting the power feed and retraction of a material gathering element relative to the pan line. Still another object of my invention is to provide an improved shaker conveyor loading apparatus having an improved mechanically operated, friction-device-controlled mechanism for effecting selective power feed or power retraction of a material gathering element relative to a pan line. Yet a further object is to provide an improved apparatus of the character mentioned having improved safety features. Still another object is to provide an improved apparatus of the character mentioned having improved mechanism for supporting the trough for delivering picked-up material to the trough line. It is also an object of my invention to provide an improved shaker conveyor loading device having manual or automatic control mechanism, and particularly such a loading device having automatic protection features irrespective of the method of control. Still another object of my invention is to provide an improved shaker conveyor loader embodying an improved adjustable bell crank operated feeding and retraction means. A still further object is to provide an improved shaker conveyor loader having improved operating and controlling apparatus which by an appropriate control of a single friction device can effect feed or retraction, or mere reciprocation between the same limits, and at all times be automatically released to avoid breakage in the event the pick-up mechanism has its power movements blocked either unidirectionally or in both directions. Other objects and advantages of my invention will hereinafter more fully appear.

In the accompanying drawings, in which for purposes of illustration several illustrative embodiments of my invention, with modifications of some of the same, are shown:

Fig. 16 is a horizontal section.

Fig. 20 is an enlarged fragmentary view of a part of the mechanism of Fig. 19.

Fig. 21 is a fragmentary section on the line

21—21 of Fig. 19, showing a detail of construction relative to the mounting of the friction band.

As will be seen from the several embodiments and modifications shortly to be described, my invention may include a trough section, desirably equipped at its forward end with a portion shaped to facilitate the gathering of material off of the mine bottom, means for supporting said trough section with its rear end overlying the forward end of the pan line, said pan line being made wider if necessary to accommodate the changes in relative position of the discharge end of said trough section, means for supporting said trough section permitting both forward and backward and angular adjustment thereof relative to said forward pan section, and means powered by the movement of said pan section for reciprocating said trough section and for altering the position of said trough section relative to said pan section. The mounting of said trough section may be in part by an independent support and in part by the forward pan section, or the trough section may be made entirely independent of the forward pan section, so far as its support is concerned.

Referring now to the drawings, and first to Figures 1 to 12 thereof, it will be observed that a base plate 1 supports a shaker conveyor drive mechanism 2, which may desirably be of a form such as is disclosed in my copending application Serial No. 595,901, filed May 26, 1945 and subsequently abandoned, a continuation-in-part thereof, Serial No. 715,526, having been filed on December 11, 1946, now Patent No. 2,633,232. Supported and suitably reciprocated by the shaker drive mechanism 2 is a portion of a pan line 3 which may consist of a number of connected pan sections 4 rigidly secured together in alinement with each other, their number being determined by the distance between the drive mechanism 2 and the point at which the material to be loaded is located, and the forwardmost pan section 4' which is shown as of the adjustable telescopic type, which may be used to permit closer adjustments, desirably having connected to it the improved gathering and loading mechanism per se of this application.

My improved gathering and loading mechanism per se as illustrated in the embodiment first to be described comprises a receiving pan section 5 of a length to accommodate the relative feeding movement of a gathering and loading pan section, and a width—wider than the pan sections 4 in many cases—such that material discharged from the rear end of such gathering and loading pan section will all fall upon the section 5. The gathering and loading mechanism per se includes a gathering and loading pan section 6, which may comprise a relatively narrow delivery section 7 and a relatively wider pick-up or gathering section 8, the latter desirably having its forward end V-shaped, with, preferably, a semi-barb shaped upward projection 9 at its apex to aid in drawing material onto the section 8, and with flange portions 10 converging from its widest portion 11 and merging into the flanges 12 of the delivery section 7. Desirably, the portion 8 will make only a small angle with the surface of the mine floor 13, and it may even be slidable flat upon the latter.

As noted, the shaker conveyor drive mechanism 2 reciprocates the pan line 3, imparting to it relatively smooth rearward movements of perhaps a few inches, with intervening sharp forward movements, so that the material will move rearwardly with the pan line during the rearward movements of the latter but will not be carried back with the pan line as the latter moves forwardly and, as it were, slips under the material thereon.

My improved gathering and loading mechanism further includes mechanism generally designated 14 for supporting the rear end of the pick-up or gathering section 6, for imparting to it—the section 6—movements in synchonism with the movements of the pan line 3, and for effecting relative advance or retraction of the section 6 relative to the section 5, and for at least permitting angular, lateral adjustment of the section 6 relative to the section 5, so that the section 8 may be caused to act on the full width of the mass of material to be loaded out.

Before the describing in detail of the mechanism 14, it may be desirably noted that the forward end of the pan section 5 may advantageously be provided with a skid device 15 and be supported by such skid device and the forward end of the pan line 3 so that its reciprocatory movements are in planes at least nearly parallel to the bottom 13.

Figure 1:
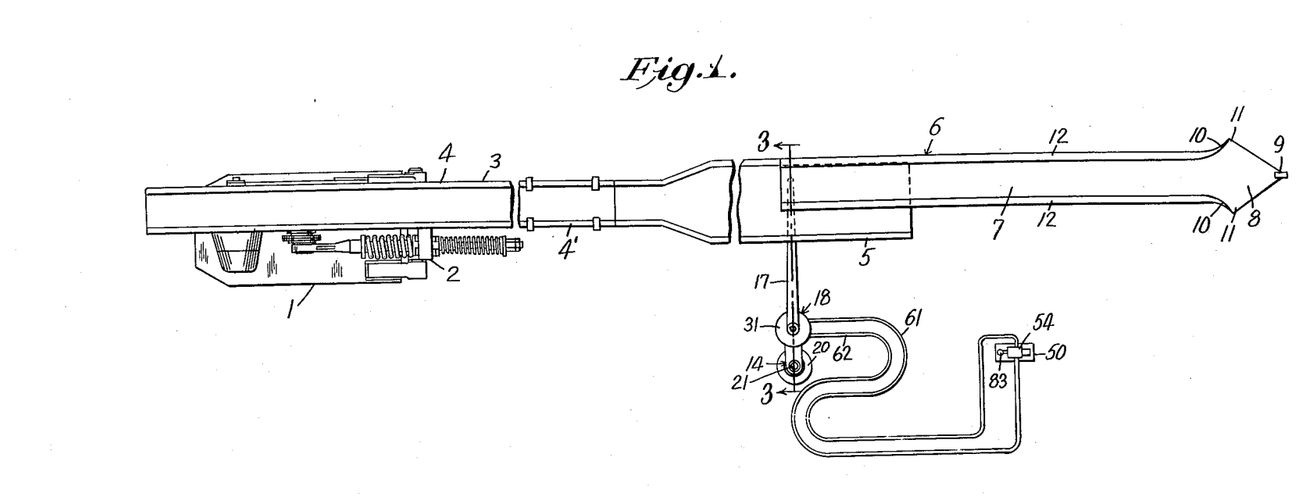
Fig. 1 is a plan view of an apparatus incorporating one embodiment of my invention, with certain parts shown diagrammatically.
Figure 2:
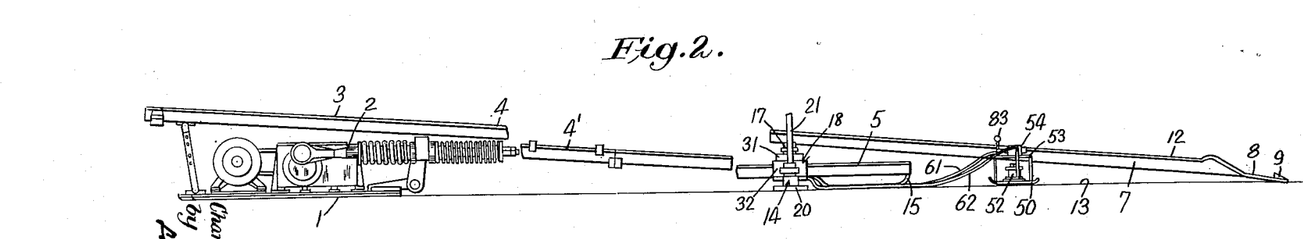
Fig. 2 is a side elevational view of the apparatus shown in Fig. 1.
Figure 3:
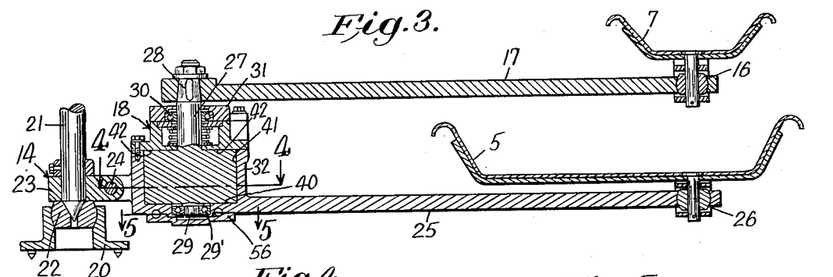
Fig. 3 is an enlarged vertical sectional view taken on the plane of the line 3—3 of Fig. 1.

Referring now to Figs. 1 and 3, it will be noted that the rearward end of the delivery pan section 7 is supported by means of a mounting 16, shown for illustration as of the limited motion ball and socket type, for relatively limited tilting and relatively unrestricted swinging adjustment upon an arm member 17 near the free end of the latter. Through the arm 17, the section 7 is not only supported at its rear end, but also reciprocated with the pan section 5, and caused to be adjusted lengthwise of such pan section. The other end of the arm 17 is connected to mechanism generally designated 18 through which the arm and the end of the pan section 7 are supported, through which the arm 17 is pivoted for swinging movement and swung, and through which its relative position with respect to the devices which swing it is altered, herein as illustrated under manual or automatic control, though either would be useful and practicable and within the scope of my invention by itself. It will be noted, again referring to Fig. 3, that a base plate 20, which may be suitably positioned on the mine bottom and held in fixed position by a roof engaging jack 21, provides through a semi-ball and socket joint 22 means whereby the axis of the roof jack may be set in desired relation to the vertical. At its lower end the jack 21 supports for pivotal movement a member 23, which, in Fig. 3, is shown as supporting through a horizontal pivot 24 an arm mechanism 25 of which the free end, so to speak, is pivotally connected to and supported by the pan section 5, by means of a joint device 26 which enables free pivotal movement between the arm mechanism 25 and the pan section and allows also an adequate degree of relative movement upon horizontal pivot axes. Desirably the location of the pivot member 23 and of the joint device will be such that the arm mechanism 25 will be relatively horizontal, and desirably the base plate 20 will be set substantially opposite or slightly forward of the mid-point, lengthwise, of the wide pan section 5, so that when the arm 17 and arm mechanism 25 are both substantially perpendicular to the axial line of the pan section 5, the rear end of the pan section 7 will be so positioned as to discharge material at substantially the central zone, lengthwise, of the pan section 5.

The arm mechanism 25, in the embodiment of the invention now being described, provides a pivotal support for the end of the arm 17 which is remote from the pan section 7. Herein this is accomplished through the mounting of the arm 17 upon a vertical shaft 27, by means, as illustrated, of a tapered, keyed connection 28. The shaft 27 is rotatably supported at 29 in a bearing 29' carried by the arm mechanism 25 near the end of the latter nearer the pivot connection 24. The shaft 27 is also journaled in another bearing 30 in the cover element 31 of a casing 32. Suitable seals to prevent leakage through the bearings may be provided as shown.

There is provided mechanism now to be described for connecting the arm 17 to move with the arm mechanism 25 in both directions, or in either direction but not in the other, and also for automatically permitting arm mechanism 25 to swing while arm 17 is prevented from swinging. The casing 32 contains a pair of approximately semi-cylindrical chambers 33, 34, separated from each other by radial wall portions or septa 35, 36 and by a portion 37 of the shaft 27 which carries radial wings 38 and 39 respectively received in and arcuately movable in the chambers 33 and 34, with the bottom walls 40, arcuate walls 41 and top walls 42 of which these wings have, either by reason of close tolerances, or by reason of suitable packings (not shown), adequately sealed engagement. It will now be evident that if the four quadrantal chambers into which the septa 35, 36 and wings 38, 39 divide the interior of the casing 32, when the arm 17 extends in the same direction as the arm mechanism 25, are each filled with a liquid, and the passage of liquid between chambers is prevented, a rigid system will exist such that the movements of the arm mechanism 25 will be transmitted to the arm 17, and both arms will, by reason of the reciprocatory movement of the pan section 5, be swung around the axis of the jack 21, and so the pan section 7, and its connected pick-up or gathering section 8, will undergo movements essentially the same as the movements of the pan section 5, at least when these pan sections are alined, in direction, extent and character, and the pick-up section 8 will gather material which it engages, and such material will be moved along the pan section 7, delivered to the pan section 5, and conveyed along the pan section 5 to a desired point of discharge. Due to the pivotal mounting 16 of the gathering and loading pan section 6, the latter may be moved arcuately over a wide range, and so an arcuate band of material can be gathered and loaded out, but for the effective loading of substantial quantities of material it is necessary that there be effected feeding movements (extension) of the section 6 relative to the pan section 5. Such movement is possible by the controlled displacement of the liquid within the chambers mentioned. For convenience, these chambers, which are essentially quadrantal in the relative positions of the parts shown in Fig. 3, but whose relative cubic contents obviously undergo marked changes upon the occurrence of relative angular movement between the wings 38, 39 and the septa 35, 36, will be designated, regardless of such relative changes in volume, 43, 44, 45 and 46, these numbers designating the first, second, third and fourth quadrant chambers in the position of the parts shown in Fig. 4.

Figure 12:
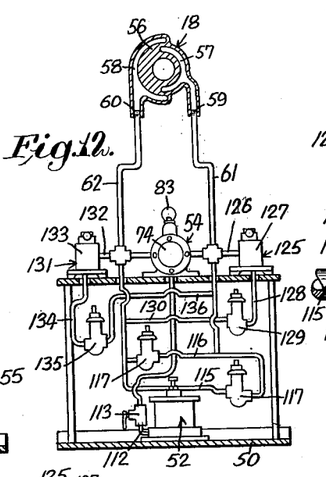
Fig. 12 is a view similar to Fig. 11 showing a modified control system incorporating apparatus for enabling automatic progressive feed and retraction.

To maintain the chambers 43, 44, 45 and 46 full of liquid, to enable relative changes in volume, and, with respect to individual chambers, to provide for either increases or decreases of volume, and to provide, as in Fig. 12, for automatically effected changes in volume at rates governed by operating conditions, the following construction and arrangements are provided.

Figure 6:
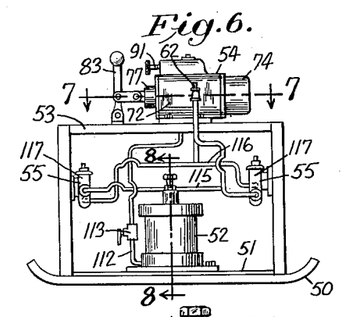
Fig. 6 is a side elevational view showing a liquid replenishing device and various controls, manual and automatic, and the mounting for said device and controls.
Figure 7:
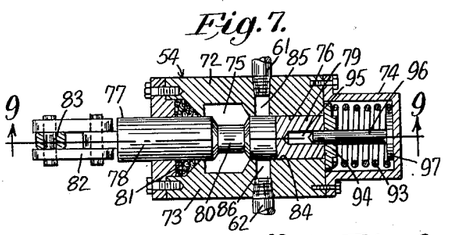
Fig. 7 is an enlarged horizontal sectional view through a primary control device, the section being taken on line 7—7 of Fig. 6.
Figure 8:
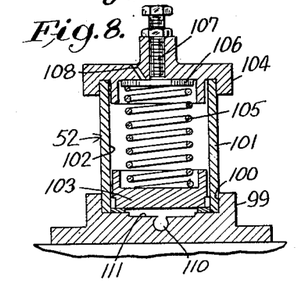
Fig. 8 is an enlarged vertical sectional view through the liquid replenishing device, the section being taken on line 8—8 of Fig. 6.
Figure 9:
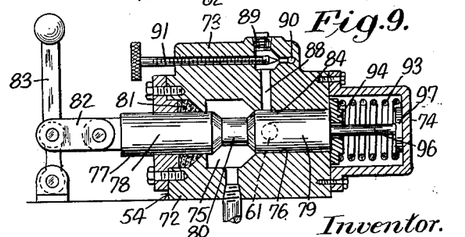
Fig. 9 is a vertical sectional view of the primary control device of Fig. 7, the section being taken on line 9—9 of Fig. 7.
Figure 10:
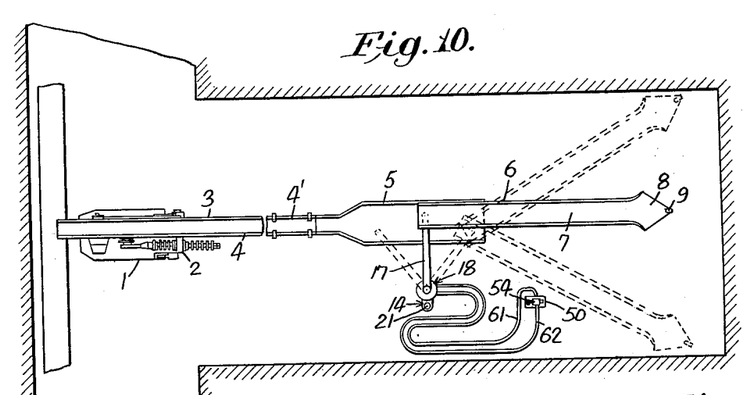
Fig. 10 is a diagrammatic plan view showing my improved loading means of Figs. 1 to 9 in operating position in a mine.
Figure 11:
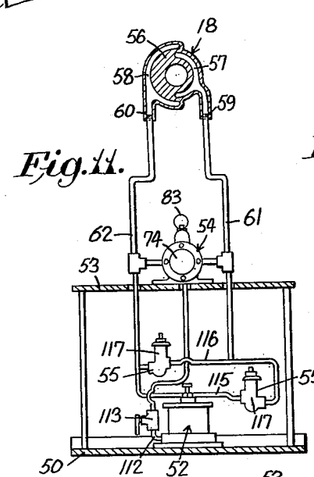
Fig. 11 is a diagrammatic view showing the control system of the apparatus of Figs. 1 to 10.
Figure 14:
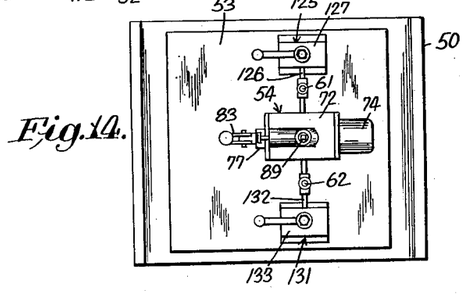
Fig. 14 is a top plan view of the control mechanism diagrammatically shown in Fig. 12.

Upon a suitable mounting, herein, in Fig. 6, illustrated as a skid mounting 50, there is provided a lower platform 51 on which a liquid replenishing device 52 is supported, and an upper platform 53 upon which a control mechanism 54 is supported. Also associated with this mounting are check valve arrangements later described, but generally indicated at 55. In Figs. 6, 7, 8, 9 and 11, an arrangement is shown in which relative movements between the arm 17 and arm mechanism 25 are wholly operator controlled—except as arm mechanism 25 may move relative to arm 17 when the latter cannot be moved; while, in Figs. 12 and 14, an arrangement including additional devices by means of which automatically controlled relative movement may be effected, is illustrated.

Considering first the arrangements of Figs. 6, 7, 8, 9 and 11, it may be noted that since this mechanism is to maintain the chambers 43, 44, 45 and 46 full of liquid and at least to permit flow of liquid between certain of said chambers, that fluid conduits communicating with such chambers must be provided. In the lower wall portion 56 beneath the several chambers, there are formed a pair of substantially semi-circular conduits or passages 57 and 58, each having a connection, respectively 59 and 60, for a flexible hydraulic fluid conduit, respectively 61 and 62. Conduit 57, at its diametrically opposite ends, communicates with bores 63 and 64, the former in septum 35 and communicating through a port 65 with chamber 43 and the latter (64') in septum 36 and communicating through a port 66 with chamber 45. The passage or conduit 58 at its diametrically opposite extremities communicates with bores 67 and 68, the former in septum 35, but radially outward of bore 63, and communicating through a port 69 with chamber 46, and the latter (68) in septum 36, but radially outward of bore 64, and communicating through a port 70 with chamber 44. It will now be evident that, starting with arm 17 directly over arm mechanism 25, if fluid be permitted to flow out of connection 59 and into connection 60 during a clockwise movement of arm mechanism 25 in Fig. 4, there will be clockwise movement of arm mechanism 25 relative to arm 17 if resistance to movement of the latter exists; that if such flow of fluid be interrupted during the ensuing counterclockwise movement of arm mechanism 25, the arm 17 will swing counterclockwise with arm mechanism 25 but occupy a position at an angle to it; and that if the flow be permitted from 59 to 60 during a series of clockwise movements of arm mechanism 25 but prevented during the intervening counterclockwise movements of such arm mechanism, the angular spread between such arm mechanism and the arm 17 will increase (from the initial overlying position) until the latter arm (17) may be in the left hand dotted position shown in Fig. 10, when arm mechanism 25 is in the full line position of that figure. Convesely, if fluid be allowed to pass from connection 60 to connection 59 during the counterclockwise movements of arm mechanism 25, starting with arm 17 directly over arm mechanism 25, but prevented from passing in either direction during the clockwise movements of such arm mechanism, the angular relation indicated between the full line position of arm mechanism 25 and the right hand dotted position of arm 17 in Fig. 10 will gradually be attained, through the progressive displacement of liquid from the chambers 46 and 44 to the chambers 43 and 45. If the connections 59 and 60 are interconnected during both of the opposite arcuate movements of arm mechanism 25, arm 17 will undergo only such movement as there may result because fluid cannot pass freely enough between the chambers. It may further be noted that what is a relatively free movement of the arm mechanism 25 relative to the arm 17 in one direction of movement of the former, amounts, as in the case of a ratchet mechanism, to a positive angular feed in the opposite direction, if fluid flow be interrupted between the chambers on the opposite movement of arm mechanism 25. See the embodiment of my invention disclosed in Figs. 18 to 21 inclusive.

Now to return to the devices 52 and 54, it will be observed that the device 54 comprises as shown a valve casing 72 made up of a main body 73 and a hollow cap portion 74. The body 73 contains a chamber 75 constituting, in effect, an enlargement between the ends of a valve receiving bore 76. A two-spool valve 77, having its spools 78 and 79 connected by a reduced stem portion 80, has its spool 78 extend through a stuffing box 81 and connected by a link 82 with a pivoted, operator controllable handle 83. The spool 79 moves in a portion 84 of the bore 76, and connections or conduits 85 and 86, to which the flexible conduits 61 and 62 respectively lead, open, as illustrated, in line with each other, into the bore portion 84, so that they may communicate with each other and with the chamber 75 when the valve 77 is moved to bring the space about the reduced stem portion 80 into communication with the connections or conduits 85 and 86. Another, vertical passage or connection 88 may serve for the introduction of hydraulic fluid into the system upon the removal of a filler plug 89 and the movement of the valve 77 to a position to connect the passage 88 with the chamber 75; and a vent port 90 for air in the system, arranged like the filler plug at the highest part of the system, is controllable by a valve 91 which may be screwed back from its seat to open communication between the passage 88 and the vent port 90. To maintain the valve 77 normally in a position to interrupt communication between the passages 85 and 86, a helical spring 93 is arranged in the hollow cap 74 and acts on a perforated disc 94 engaged with the end of the spool 79. A bore 95 is formed in spool 79 and slidably engages a stem 96 projecting from a disc 97 lying inside the helical spring 93, which engages the inner surface of the head of the hollow cap 74 at its end remote from the perforated disc 94. In the normal closed position of valve 77 the outer portion of the disc 94 engages the end surface of the casing member 73.

The liquid replenishing device 52 is arranged so that it may be placed in communication at will with the fluid system. It consists of a base portion 99 having a circular recess 100 for receiving a cylindrical wall 101, said cylindrical wall 101, which has a bore 102 in which a suitably packed piston 103 is slidable, a head 104 mounted on top of said cylindrical wall 101, a loading spring 105 acting between an upper surface of the piston 103 and a follower plate 106, the follower plate 106, and a screw 107 acting on the follower plate 106 and adjustable to vary the compression of said spring 105. A bleed port 108 opens through the head 104. Any suitable means may be provided to effect communication of the space below the piston 103 with the fluid system, and I have shown a transverse bore 110 breaking through the bottom wall 111 of the space beneath piston 103 and connected at one end through a conduit 112 controlled by a quick acting valve 113 with the chamber 75. Thus when valve 113 and valve 77 are open and the apparatus is at rest, all parts of the hydraulic system may be fully recharged with liquid if any leakage should have occurred.

The apparatus so far described will cause the arm 17 to move in synchronism with the arm mechanism 25, will permit it to remain stationary while the arm mechanism 25 continues to oscillate, and will permit the effecting of relative angular movements of opposite hands between the arm 17 and arm mechanism 25, so that feeding and retraction of the gathering mechanism 6 may be effected, but there remains one condition for which it does not provide; namely, the interruption of movement of the devices connected to the arm 17 while the drive of arm mechanism 25 continues. Such a condition might arise in the event of a roof fall on the pan 8 or when the pan 8 strikes an obstruction during feeding. If the angular relation between arm mechanism 25 and arm 17 were changed during the counter-clockwise movement of the former as previously described, and if, with valve 77 closed again, the two arms were moved clockwise in locked relation, and the pan 8 struck an immovable obstruction, breakage or bending of the parts might occur were it not for the auxiliary devices I shall now describe. This might also be the case regardless of the direction of movement of pan 8, if a roof fall occurred upon it.

Figure 13:
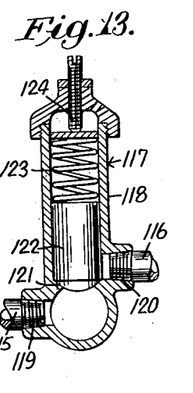
Fig. 13 is a sectional view through a relief valve forming a part of the control apparatus.

To permit the arm 17 to remain stationary when the arm mechanism 25 is moving, in the event of a resistance to movement of the arm 17 so great as to cause damage unless it be released from the arm mechanism 25 sufficiently to permit relative movement between them, I have provided connections between the conduits and opposite sides of the valve mechanism 54 to permit bypassing of fluid in either direction past this valve mechanism when it is closed, upon the occurrence of resistances to movement of the arm 17 great enough to endanger the apparatus. This automatic bypassing or automatic relief means includes two fluid conducting conduits numbered 115 and 116 respectively, each adapted to permit fluid to pass in one direction from one side of valve mechanism 54 to the other—one, 115, from conduit 61 to 62 and the other, 116, from conduit 62 to 61. This selective direction of flow is secured by the provision of a check valve mechanism 117 in each of the conduits 115 and 116, the check valve mechanisms restricting flow to the desired directions. These check valve mechanisms, which are also pressure relief valves, each (see Fig. 13) comprise a casing 118 with an inlet connection 119 and an outlet connection 120 and with a valve seat 121 upon which a valve 122 is adapted to be normally seated under the action of a spring 123 having a compression adjusting mechanism 124. The valves are held seated by pressures of such magnitude that only when a pressure above that needed to effect normal loading and feeding action with respect to loose coal exits in the chambers 43, 45 or 44, 46 will the valve be unseated. Any suitable valve in which opening movement does not allow a pressure change which will tend to reseat the valve due to the action of the fluid which has passed it is adapted to this use. If on a clockwise swing of arm mechanism 25, like swinging movement of arm 17 is resisted so strongly that damage to the apparatus would result if relative movement between the arm and arm mechanism were not permitted of such a nature that the arm mechanism could make its movement while the arm 17 remained stationary or received a smaller movement clockwise, the resultant liquid pressure in the chambers 43 and 45 would become sufficient to cause the valve 117 in line 115 to open and allow the arm mechanism 25 to move relative to the arm 17. Similarly, in the event of a rock fall as arm mechanism 25 is moving counterclockwise, the check valve 117 in line 116 would open under the high pressure in conduit 62, and the arm mechanism 25 would move relative to the then held arm 17.

While the apparatus as so far described will operate very effectually with adjustments between the arm mechanism 25 and the arm 17 accomplished wholly under operator control, there may desirably be provided two stop and check valve controlled connections between the opposite sides of the valve device 54. One such connection 125 may comprise a conduit portion 126 connecting space in communication with the conduit 61 with a manually operable stop valve 127 which may be of the quick acting type, a further conduit portion 128 connecting the stop valve 127 with a check valve device 129 permitting fluid flow only in a direction from conduit 61 towards conduit 62, and a further conduit portion 130 connecting the check valve device in communication with the conduit 62. Another cross connection 131, for permitting fluid to pass when desired from conduit 62 to conduit 61, may include a conduit portion 132 connecting conduit 62 with a manually operable stop valve 133 which is desirably of the quick acting type, a second conduit portion 134 connecting said stop valve 133 with a check valve device 135, which permits fluid passage only in the direction from conduit 62 to conduit 61, and a final conduit portion 136 connecting said check valve device in communication with the conduit 61. While I have referred to conduits 61 and 62 in the description of these auxiliary, check and stop valve controlled connections, it will be appreciated that such auxiliary connections need not be made between the flexible conduits 61 and 62, but may be formed between any suitable rigid pipe, or even bored or cored, conduits connected with the conduits 61 and 62, if preferred.

Figure 15:
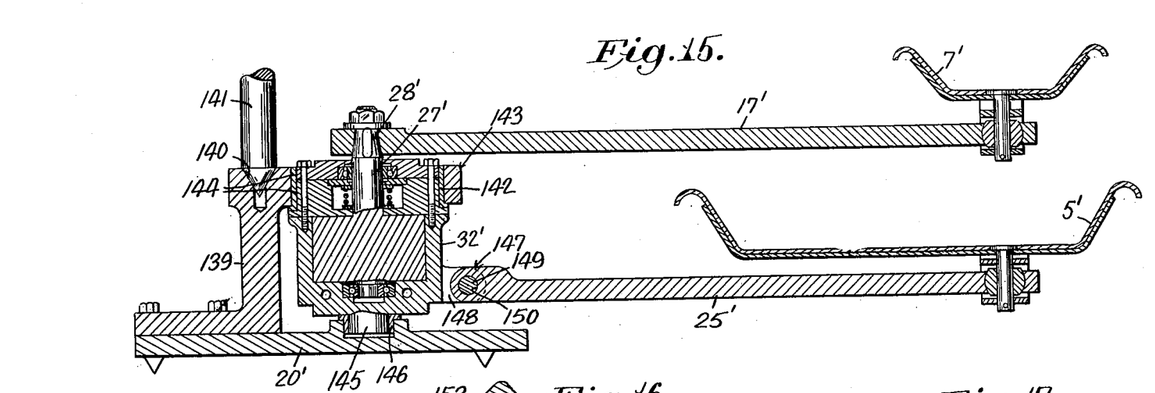
Fig. 15 is a vertical sectional view similar to Fig. 3 showing a modified construction in which the feeding trough is supported wholly independently of the shaker conveyor.

In Fig. 15 an illustrative embodiment of my invention is shown in which, in distinction to the embodiment of Figs. 1 to 11, no part of the load of the pan section 7 is supported on the pan section 5 and in which the pivot axis upon which the arm 17 is movable relative to the actuating arm mechanism is not offset from the pivot axis on which the actuating arm mechanism swings.

Referring in detail to this figure, it will be noted that the rear end of the pan or trough section 7' is supported in a manner similar to that in which the section 7 is supported upon the arm 17, upon an arm 17', which may be the same except, perhaps, for the matter of length, as the arm 17. It is mounted by means of a taper and key connection 28' on the upper end of a shaft 27'. A base 20', adapted to rest upon the mine bottom, carries an upstanding bracket 139 which provides a seat 140 for a roof engaging jack 141 and supports a ring bearing 142 for drive and adjustment mechanism 143 essentially the same, except for the manner of pivotal mounting thereof and its manner of connection with the pan section 5', as the corresponding portions of the embodiment first described. Here, however, it will be noted that the casing 32', internally the same as the casing 32, is journaled for pivotal movement by means of a cylindrical bearing surface 144 formed on the head members thereof and cooperating with the ring bearing 142, and by a central bottom bearing stud 145 received in a bearing 146 carried upon the plate 20'. And the arm 25', which transmits motion from the pan 5' to the casing 32' is connected to the latter through a pivot structure 147, which transmits to the casing 32' the horizontal angular movements of the arm 25', but permits free up and down movements of the remote end of the arm without affecting the casing 32'. This pivotal mechanism includes, as illustrated, bored ears 148 on the casing 32', and a pivot pin 149 passing through said ears, and a bore 150 in the end of the arm 25' nearer to the casing 32'. The operative connections—chambers, septa, vanes, etc.—between the shaft 27' and the casing 32', and the controls, are essentially the same as in the construction previously described.

Figure 4:
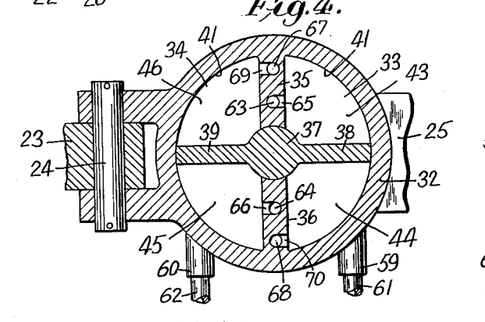
Fig. 4 is a further enlarged horizontal sectional view taken on the line 4—4 of Fig. 3.
Figure 5:
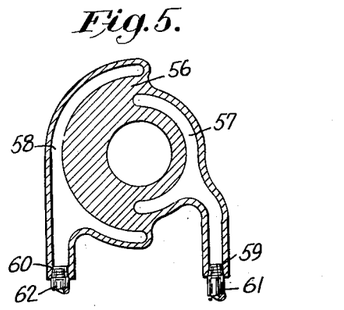
Fig. 5 is an enlarged horizontal sectional view taken on the line 5—5 of Fig. 3.
Figure 16:
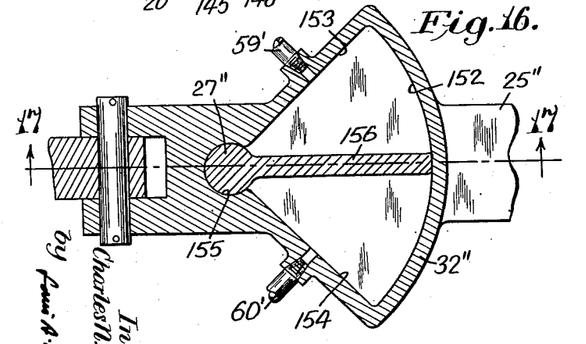
Figure 17:
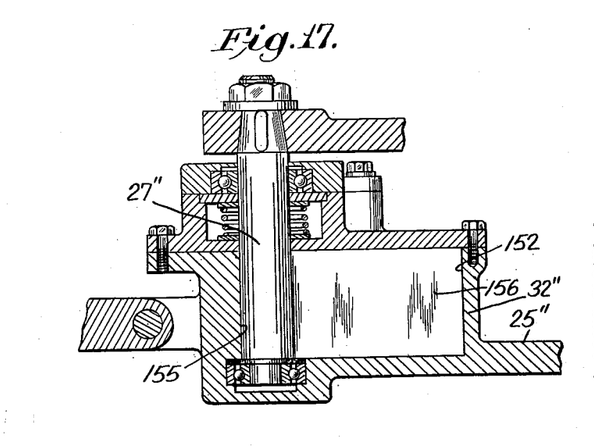
Fig. 17 is a vertical section on the line 17—17 of Fig. 16, showing a modified construction of bell crank angularity control.
Figure 18:
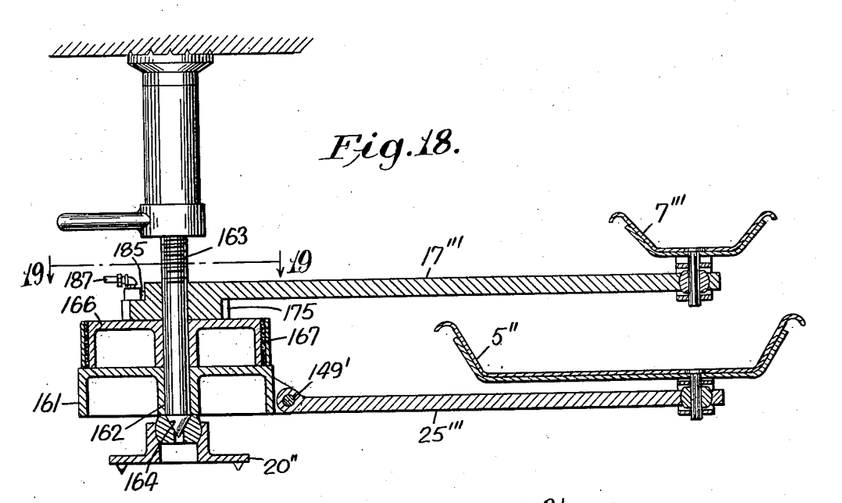
Fig. 18 is another view similar to Figs. 3 and 15 showing a mechanical angularity control for the bell crank.
Figure 19:
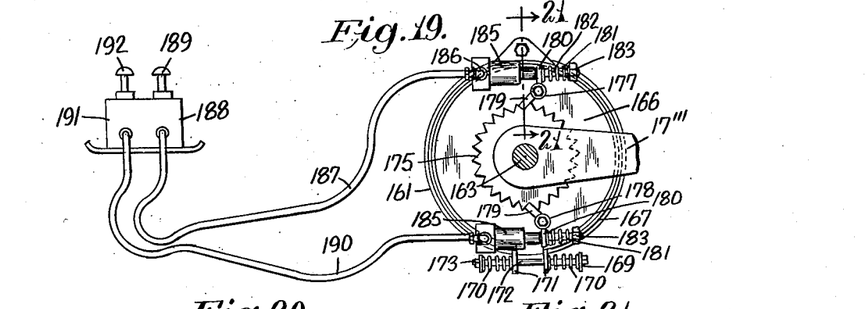
Fig. 19 is a fragmentary diagrammatic view showing details of the mechanism of Fig. 18, parts being shown on the section of line 19—19 of Fig. 18.
Figures 20, 21:
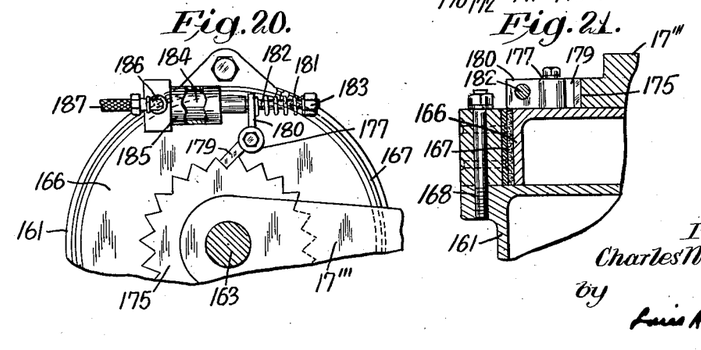

In Figs. 16 and 17 I illustrate a modification which closely follows, in general, the arrangements illustrated in Figs. 3 and 4, but in which the arm mechanism 25'' supports a casing 32'' of approximately quadrantal shape, having an arcuate surface 152, a pair of plane upright side surfaces 153 and 154 and a recess 155 for the reception of the shaft 27'' connected to and supporting the relatively narrow delivery section of the gathering and loading pan section. The shaft 27'' is provided with a single vane 156, and the connections 59' and 60' open through the walls 153 and 154.

The mode of operation of the illustrative embodiments of my invention so far described will be readily understood from the detailed descriptions of their structure, but may be set forth here.

Referring first to the arrangement shown in Figs. 1 to 11, it will be observed that the shaker drive mechanism 2 reciprocates the trough line 3 with a motion which consists of relatively rapidly accelerated, high-speed forward thrusts, and slower, more evenly accelerated outward movements. These movements are transmitted to the relatively wide receiving trough section 5 and by it, through the pivotal connection 26, are transmitted to the arm mechanism 25. This arm mechanism is caused thereby to swing upon the pivot mounting 23 about the axis of the roof jack 21. Assuming that the chambers 43, 44, 45 and 46 are all maintained completely full of liquid, and that the valve 77 is in the position shown in Fig. 9, with communication between the conduits 61 and 62 interrupted, it will be seen that the arm 17, which supports through the pivot connection 16 the delivery pan or trough section 7, will be in fixed relation with respect to the arm 25, and accordingly all of the oscillation of the arm 25 will be transmitted to the arm 17, and all of the reciprocatory movements of the wide trough section 5 will be transmitted to the delivery trough 7. When it is desired to commence the loading out of a mass of shot material, the arm 17 and the arm mechanism 25 will not normally initially be in the relative position shown in Fig. 3 and indicated in full lines in Fig. 10 but rather the arm 17 will be in the left hand dotted position in Fig. 10 when the arm mechanism 25 is in its mid-position. This will make it possible by relative adjustment between the arms for the trough section 7 and the gathering end 8 to be fed forwardly a distance nearly equal to the length of the wide trough section 5, and permit the loading out of most of the material that will be shot following the making of an undercut. It will be understood, as previously explained, that the jack 21 will be approximately opposite the mid-point in the receiving trough section 5.

Assuming now that operation is being started with the arm 17 in its counterclockwise angled relation to the arm mechanism 25 and that the system is being reciprocated with the shaker conveyor type motion previously described, the gathering section 6 will be barred over to a position near one of the ribs and the operator will then take steps to cause a feeding movement of the gathering portion of the feeder mechanism forwardly along that rib and to the face of the solid coal standing after shooting was completed; thereby loading out a section of substantially the depth of the undercut before the shovel portion 8 is retracted and the next section of material is loaded. In order to effect advance of the shovel, the operator will take hold of the lever 83 after having gotten his hand into synchronism with the movements of the feeder, a thing which will be easily possible because the number of reciprocations per minute will not be above a rate which will readily permit this to be done. When feed toward the face is desired, the operator will move the valve 77 to open communication between the passages 85 and 86 during outward (counterclockwise) angular movement of the arm mechanism 25. He will close the valve 77 during the ensuing forward movement of the arm mechanism 25. This may be repeated as often as necessary. During each of the outward movements of the arm 25 liquid will pass from the chambers 44 and 46 into the chambers 43 and 45, provided forward movement of the loading pan 8 is possible. If there is an obstruction to the movement of this pan which prevents such advance or feeding movement, the mechanism 6 will not be advanced, but instead the angular relation previously subsisting between the arm 17 and the arm mechanism 25 will be restored, as will shortly be explained.

It will be remembered that as the arm mechanism 25 moves clockwise it places under pressure the liquid in the chambers 43 and 45, and as it moves counterclockwise it places the liquid in the chambers 44 and 46 under pressure. Accordingly if the valve 77 is moved to open communication between the conduits 61 and 62 as the arm mechanism 25 is moving counterclockwise, liquid will be displaced from the chambers 44 and 46 to the chambers 43 and 45, and if the valve 77 is closed at the end of such counterclockwise movement, it will be found that there has been, in effect, an angular advance of the arm 17 clockwise relative to the arm mechanism 25 (really, of course, the arm mechanism 25 has moved counterclockwise relative to the arm 17). Now, on the next clockwise movement of the arm mechanism 25, if the valve 77 is closed, the changed relative position of the arm 17 will cause the shovel plate 8 to advance by the amount of the increased forward movement of the pivot connection 16. Such feeding movement will occur unless there is an obstruction which prevents its taking place. If such an obstruction exists, then, were it not for the protection provided by the loaded check valve arrangement, damage to the parts might occur. But with this check valve mechanism, the highly increased fluid pressure will cause check valve 117 in conduit 115 to open, and liquid will be forced back into the chambers 44 and 46, and the angular relation of the arm 17 to the arm mechanism 25 will be restored. The operator will continue to open the valve 77 on each counterclockwise movement of the arm mechanism 25 until the obstruction either breaks under the repeated thrusts or, if this does not quickly occur, the operator will shut down the shaker drive, and the obstruction will be removed.

To effect retraction of the loading means 6, the operator will open valve 77 on the clockwise movements of the arm mechanism 25 and close it during the counterclockwise ones. This will allow liquid to pass from the chambers 43 and 45 to the chambers 44 and 46, and as the volumes of the latter chambers increase there will be a gradual movement of the arm mechanism 25 relative to the arm 17 and, as a result, a retraction of the gathering mechanism 6. If an obstruction to retraction were encountered, the other check valve 117, the one in conduit 116, would function to prevent damage, in a manner similar to that described above.

If there were a roof fall on the pan 8, so that movement of the gathering mechanism 6 in either direction would be impossible, the fluid in the chambers 43, 45, 44 and 46 would be forced back and forth past the check valves in the conduits 115 and 116 and so no damage would be done.

The setting (loading) of the check valves 117 in the conduits 115 and 116 will be high enough to cause the loose material to be loaded out without flow past the check valves occurring in either direction, but low enough to permit by-passing to occur before injury to the mechanism can take place.

With reference to the arrangement shown in Fig. 12, it will be understood that when feed or retraction of the gathering mechanism is desired, the valve 77 may be left closed, and by opening one or the other of the stop valves 127 or 133, feed or retraction may be effected.

It will be understood that while this type of feed towards the face is being effected, loading out is substantially discontinued, as the rearward movements of the loading trough do not occur during free forward feed. When such relatively free forward feed is desired, stop valve 133 will be opened, and on counterclockwise movement of arm mechanism 25, fluid will move past the check valve 135 from chambers 44 and 46 to chambers 43 and 45, but reverse flow will be prevented by the check valve on clockwise movement of arm mechanism 25, and this, again in the absence of an obstruction, will cause forward feed to be effected. If an obstruction of sufficient gravity exists, the check valve 117 in the conduit 115 will permit return flow of fluid instead of damage occurring. Retraction by opening stop valve 127, and protection during retraction by the check valve 117 in the conduit 116, will of course be possible.

In Figs. 18, 19, 20 and 21 I have illustrated another modification of my invention in which all hydraulic apparatus has been replaced by mechanical structure with the exception of the fact that I still use for convenience hoses and hydraulic pressure to set in operation two ratchet controls. However, all of the basic functions of the hydraulic mechanism of the embodiments shown in Figs. 1 to 14, are found in the mechanism of Figs. 18, 19, 20 and 21. Here it will be observed that the shaker driven trough section 5" is connected, as in the first form of the invention, to an arm mechanism which is here numbered 25'''; and this arm mechanism is pivotally connected on the horizontal pivot 149' to a support member 161 journaled as at 162 on a cylindrical surface on the bottom of a jack element 163, which is received in a socket 164 on a floor engaging bottom plate 20''. The support plate 161 carries upon its upper surface, in rotatable relation thereto, another support plate 166, and the friction band 167 secured as at 168 to the support plate 161 may be tightened to any desired tension by means of an adjusting mechanism 169. The mechanism 169 may assume many forms, and is here shown as comprising a pair of springs 170 acting on ears 171 secured to the free ends of the friction band 167 and having their compression adjusted by means of a through screw 172 and an adjusting nut 173. As will later become apparent, the tension of the friction band is so chosen as to permit the support member 161 to rotate relative to the support member 166 when, but only when, excessive resistances to movement of the pick-up mechanism occur. Rotatably supported above the support member 166 is a ratchet wheel 175 which supports the arm 17''', which in turn supports the delivery trough section 7''' of the pick-up mechanism. Cooperating with ratchet wheel 175 are a pair of pawl devices 177, 178 each supported for pivoting on axes carried in fixed relation to the support member 166 and each comprising a ratchet-engaging portion 179 and an arm 180, with which a spring 181 cooperates. The spring surrounds a rod 182 carrying an adjusting nut 183 whose position can be changed to vary the compression of the spring 181, and the rod 182 carries a piston 184 at one end which moves in a hydraulic cylinder 185 supported on the support member 166 and having a fluid supply connection 186 to which there leads a fluid conduit 187, through which fluid may be supplied from a pressure creating device 188, having a manual operating element 189. The pawl 178 has similar control mechanisms and fluid is conducted to its operating cylinder through a conduit 190 in which pressure may be built up by a manual pressure creating device 191 having an operating plunger 192. The construction of these pressure producing devices need not be described in more detail as they are essentially well-known mechanisms and simply comprise hand operated plungers acting on a fluid column and adapted to place it under pressure and to move it sufficiently to compress the springs 181 and render the pawls 177 or 178, or both, ineffective at will.

That this mechanism embodies my basic invention will be obvious for it will be perceived that the motions of the arm 25''' will be transmitted to the support member 161 and from the latter to the support member 166 when the friction band 167 is properly tightened. The motion of the support member 166 will be transmitted to the arm 17''' and to the trough section 7''' when the pawls 177 and 178 are both in their operative positions shown in Fig. 19. Under these circumstances the arm 17''' will move with the arm mechanism 25''', just as the arm 17 moves with the arm mechanism 25 when communication is cut off between the conduits 61 and 62. When adjusting in one direction of the arm 17''' and its supported trough, relative to the arm mechanism 25''' is desired, one or the other of the pawls 177 or 178 may be rendered inoperative during the swinging movement of the arm mechanism 25''' in the proper direction and allowed to become operative during the opposite movements of said arm mechanism. For example, during the counterclockwise movement of the arm 25''', the pawl 177 may be made ineffective, and this will permit the arm 25''' to move counterclockwise relative to the arm 17'''. If on the clockwise movement of the arm mechanism 25''' the pawl 177 is again allowed to become operative, the arm 17''' will be found to be advanced clockwise relative to the arm mechanism 25'''. On the next movement of the arm mechanism 25''' clockwise the arm 17''' will move with it in its new angular relation unless the encountering by the loading pan 8 of an obstruction or some other difficulty makes the movement of the arm 17''' impracticable. In that event, the friction band 167 will slip, and at the end of the clockwise movement of the arm mechanism 25''', the relation between the arms will be the same as at the beginning of the cycle of the movement of the arm mechanism 25'''. Motion of the arm 17''' relative to the arm mechanism 25''' to effect retraction of the trough 7''' may obviously be effected by appropriate control of the pawl 178.

The mechanism is very simple, in that if the operator leaves the plunger 189 and 192 alone, there will be no feeding in either direction, whereas all he has to do to effect feeding or retraction is to push on the plunger 189 or on the plunger 192 at the proper times. If he pushes on them both at once, the arm 17''' is cut loose from the arm mechanism 25'''.

Figure 22:
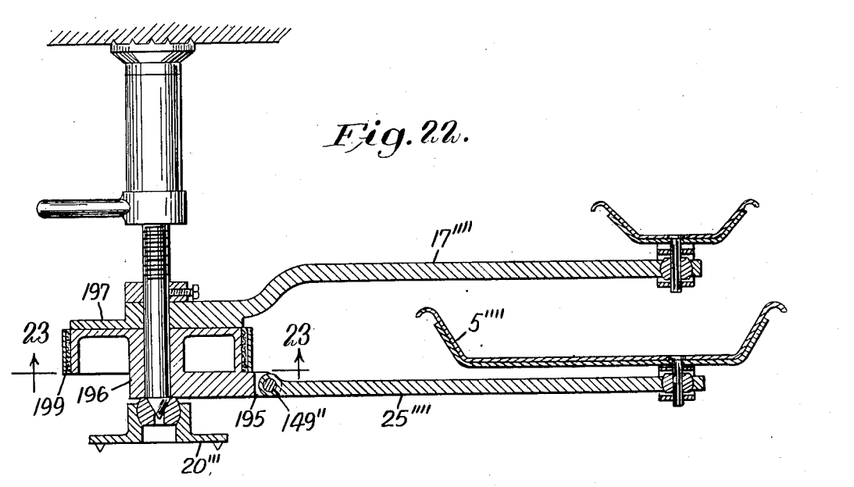
Fig. 22 is a view similar to Fig. 18, showing a further and more simplified embodiment of my invention.
Figure 23:
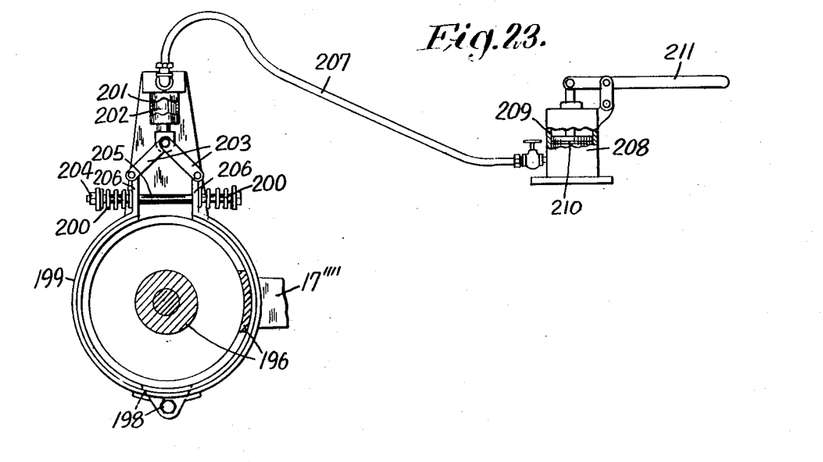
Fig. 23 is a somewhat diagrammatic illustration of the apparatus of Fig. 22, showing details of the control and having parts shown on the plane of the line 23—23 of Fig. 22.

In Figs. 22 and 23 a still simpler embodiment of my invention in many of its aspects is disclosed. The trough 5'''' is connected for operation by an arm mechanism 25'''', which is pivotally connected at 149'' with another arm portion 195 journaled on a roof jack positioned supporting plate 20''' and secured to a support member 196. Above the support member 196, which is also journaled on the mine jack, is a support member 197 to which the arm 17'''' is fixed. The support member 197 has attached to it, as at 198, a friction band 199; and this friction band may be applied at will or released by mechanism including springs 200 constantly urging the ends of the friction band together, and mechanism, herein a hydraulic cylinder 201 with piston 202 adapted to act through toggle mechanism 203 to overcome the springs and release the friction band tension at will. The normal band tension can be set by the nut 204 on the screw threaded end of the rod 205 passing through the springs and the ears 206 on the band 199. The piston 202 is normally maintained in outward position in its cylinder 201 by the action of the springs 200, and in this position of the piston the friction band is tightened to the desired degree. A fluid conduit 207 leads to the cylinder 201, and a hand-operated hydraulic cylinder and piston mechanism 208, consisting of a fluid containing cylinder 209, a plunger 210, and a lever 211, may be used for causing the piston 210 to move in the cylinder 209 and transmit pressure through the conduit 207 to the piston 202 to slacken the friction band.

The mode of operation of this arrangement is as follows: If the operator wants the arm 17'''' to move with the arm 25'''', he does nothing, and the friction band 199 then holds the support member 197 in fixed angular relation to the support 196, and only in the event that excessive resistances to movement of arm 17'''' are encountered, for example because of a roof fall or the encountering by the loading pan 8 of an obstruction, will there be slippage of the support member 197 relative to the support member 196. If the operator wishes to effect advance of the arm 17'''' clockwise relative to the arm 25'''', he will apply pressure to the piston 202 during the counterclockwise movements of the arm 25'''' and relieve that pressure during the clockwise movements. If he wishes to have counterclockwise relative movement of the arm 17'''' with respect to the arm mechanism 25'''', he will simply apply pressure to the piston 202 during the clockwise movements of the arm 25'''' and relieve that pressure during the counterclockwise movements of the arm 25''''. Arm 17'''' can be fully released from arm mechanism 25'''' simply by maintaining the piston 202 under pressure.

It will be evident that in this invention in its various embodiments, I have provided an improved mechanism for effecting the drive of a gathering or loading mechanism from a pan line and effecting relative adjustment between the loading mechanism and the pan line so as to permit the loading out of the material normally shot down after the making of an undercut; and my invention incorporates mechanism for the prevention of breakage, either in the event that a roof fall occurs when no feed is taking place or in the event that an obstruction is encountered during feeding. It will be evident that improved controls are present enabling feed or retraction to be effected as desired but still maintaining the safety feature of permitting automatic relative movement between the arm and its actuating arm mechanism in the event of overload. It will further be noted that I have provided an improved mechanism for selectively connecting the driving and driven elements which are pivotally connected to the pan and trough sections respectively, in fixed relative position with respect to each other for movement as a unitary body or for releasing their connection at will to enable adjustment of the driving element relative to the driven element.

A further summarization of the advantages and improvements provided by my invention is not necessary in view of the full explanation of those given above.

While I have in this application specifically described several embodiments and various modifications which my invention may assume in practice, it will be understood that these forms and modifications are shown for purposes of illustration and that the invention may be further modified and embodied in various other forms without departing from its spirit or the scope of the appended claims.

What I claim as new and desire to secure by Letters Patent is:

1. A loading attachment for a reciprocating conveyor including a reciprocated pan section, a delivery trough section having a material pick-up section at one end thereof, said delivery trough section having its other end overlying said reciprocated pan section in position to deliver material picked up by said material pick-up section to said reciprocated pan section, and means for transmitting motion from said reciprocated pan section to said delivery trough and pick-up sections including driving and driven elements pivotally connected to said pan and trough sections respectively and means for selectively connecting said elements in fixed relative position with respect to each other for movement as a unitary body or for releasing their connection at will to enable adjustment of the driving element relative to the driven element.

2. A loading attachment as defined in claim 1 in which said means for selectively connecting said driving and driven elements in fixed relative position with respect to each other for movement as a unitary body or for releasing their connection at will to enable adjustment of the driving element relative to the driven element includes a friction device releasable automatically on excessive resistances to movement of said driven element.

3. A loading attachment as defined in claim 1 in which said means for selectively connecting said driving and driven elements in fixed relative position with respect to each other for movement as a unitary body or for releasing their connection at will to enable adjustment of the driving element relative to the driven element, includes a friction device releasable on excessive resistances to movement of said driven element, and operator controlled means for rendering said friction device effective to connect said elements in fixed relative position with respect to each other for movement as a unitary body or for releasing their connection at will.

4. A loading attachment for a reciprocating conveyor including a material-receiving pan section power reciprocated with a shaker motion, a gathering and loading pan section including a delivery trough section at one end thereof positioned for delivering material to said material-receiving section and a material pick-up section at the other end thereof, and means for causing said material-receiving pan section to impart material-loading movements to said gathering and loading pan section and to effect bodily feeding of said gathering and loading pan section relative to said material-receiving pan section including an element driven by said material-receiving pan section and having a connection with the latter including a pivot through which drive is transmitted to it, an element connected to said gathering and loading pan section to actuate the same and having a pivot through which drive is transmitted to said gathering and loading pan section from said last element, and mechanism for effecting connections between said elements in different fixed relative positions with respect to each other for movement in each of such positions as a unitary body or for releasing such connections.

5. A loading attachment for a reciprocating conveyor as defined in claim 4 in which said mechanism for effecting connections for movement as a unitary body between said element driven by said material-receiving pan section and said element connected to said gathering and loading pan section to actuate the same includes hydraulic mechanism for establishing connections in fixed relative position with respect to each other, for movement as a unitary body, between said elements.

6. A loading attachment for a reciprocating conveyor as defined in claim 5 in which said hydraulic mechanism for establishing connections in fixed relative position with respect to each other, for movement as a unitary body, between said elements has a controlling valve and pressure relief valve controlled connections by-passing said controlling valve.

7. A loading attachment for a reciprocating conveyor as defined in claim 4 in which said mechanism for effecting connections for movement as a unitary body between said element driven by said material-receiving pan section and said element connected to said gathering and loading pan section to actuate the same includes hydraulic mechanism for establishing connections in fixed relative position with respect to each other, for movement as a unitary body, between said elements having a primary controlling valve, pressure relief valve controlled connections by-passing said controlling valve, and stop and check valve controlled connections also by-passing said primary control valve.

8. A loading attachment as defined in claim 4 in which said mechanism for effecting connections for movement as a unitary body between said element driven by said material-receiving pan section and said element connected to said gathering and loading pan section to actuate the same includes means forming chambers of which the relative volumes are altered on movement between said elements, a hydraulic fluid in said chambers, and means for controlling communication between said chambers.

9. A loading attachment as defined in claim 4 in which said mechanism for effecting connections for movement as a unitary body between said element driven by said material-receiving pan section and said element connected to said gathering and loading pan section to actuate the same includes means forming chambers of which the relative volumes are altered on movement between said elements, means for maintaining said chambers full of a hydraulic fluid and means for controlling communication between said chambers.

10. A loading attachment as defined in claim 4 in which said mechanism for effecting connections for movement as a unitary body between said element driven by said material-receiving pan section and said element connected to said gathering and loading pan section to actuate the same includes means forming chambers of which the relative volumes are altered on movement between said elements, a hydraulic fluid in said chambers, and means for controlling communication between said chambers including an operator-controllable valve device movable to establish communication between said chambers during certain movements of said second element and to interrupt such communication during the opposite, intervening movements of said second element.

11. A loading attachment as defined in claim 4 in which said mechanism for effecting connections for movement as a unitary body between said element driven by said material-receiving pan section and said element connected to said gathering and loading pan section to actuate the same includes means forming chambers of which the relative volumes are altered on movement between said elements, a hydraulic fluid in said chambers, and means for controlling communication between said chambers including parallel check and stop valve controlled passages, one controllable to provide for flow of fluid in one direction during the movements of said element driven by said material-receiving pan section and the other controllable to provide for flow of fluid during the movements of said element driven by said material-receiving pan section in the other direction.

12. A loading attachment as defined in claim 4 in which said mechanism for effecting connections for movement as a unitary body between said element driven by said material-receiving pan section and said element connected to said gathering and loading pan section to actuate the same includes means forming chambers of which the relative volumes are altered on movement between said elements, a hydraulic fluid in said chambers, and means for controlling communication between said chambers including a valve movable to establish such communication at will, stop and check valve controlled conduits for by-passing said valve at will and relief valve controlled conduits by-passing said valve automatically upon excessive resistances to movement of said first mentioned element.

13. A loading attachment as defined in claim 4 in which said mechanism for effecting connections for movement as a unitary body between said element driven by said material-receiving pan section and said element connected to said gathering and loading pan section to actuate the same includes ratchet and pawl mechanism for controlling the operative connection between said elements.

14. A loading attachment as defined in claim 4 in which said mechanism for effecting connections for movement as a unitary body between said element driven by said material-receiving pan section and said element connected to said gathering and loading pan section to actuate the same includes releasable frictional connections between said elements.

15. A loading attachment as defined in claim 4 in which said mechanism for effecting connections for movement as a unitary body between said element driven by said material-receiving pan section and said element connected to said gathering and loading pan section to actuate the same includes operator-releasable frictional connections normally operative to connect said elements in fixed relative position with respect to each other.

16. A loading attachment as defined in claim 4 in which said mechanism for effecting connections for movement as a unitary body between said element driven by said material-receiving pan section and said element connected to said gathering and loading pan section to actuate the same includes a friction device loaded to slip upon the occurrence of excessive resistance to movement of said element connected to said gathering and loading pan section to actuate the same.

17. A loading attachment for a reciprocating conveyor as defined in claim 4 in which said mechanism for effecting connections for movement as a unitary body between said element driven by said material-receiving pan section and said element connected to said gathering and loading pan section includes means for automatically disconnecting them upon excessive resistance to movement of said element connected to said gathering and loading pan section.

18. In combination, a reciprocated pan section, a pick-up trough section, a delivery trough section connected to said pick-up trough section for moving the latter to effect material pick-up and to receive material picked up by said pick-up trough section and discharge such material to said reciprocated pan section, and means for connecting said delivery trough section with said reciprocated pan section for reciprocation thereby and for longitudinal feeding movement relative thereto including a first arm pivotally connected to one of said sections, a second arm pivotally connected to the other of said sections, each of said arms having an upright pivot at a point remote from its pivotal connection with a section, and means for releasably connecting said arms in a plurality of fixed relative positions including parallelism with each other.

19. The combination recited in claim 18 in which said upright pivots are in line with each other.

20. The combination recited in claim 18 in which one of said arms has a horizontal pivot between its pivotal connection with a section and its upright pivot.

21. The combination recited in claim 18 in which said upright pivots are laterally offset from said pan sections.

22. The combination recited in claim 18 in which the arm pivotally connected to said delivery trough section has its upright pivot on said arm pivotally connected with said reciprocated pan section.

23. The combination recited in claim 18 in which the arm pivotally connected to said reciprocated pan section has a horizontal pivot between its pivotal connection with said pan section and its upright pivot, and the arm pivotally connected to said delivery trough section has its upright pivot on the arm pivotally connected with said reciprocated pan section at a point near the horizontal pivot in the latter.

24. The combination defined in claim 18 in which said first arm is pivotally connected to and supports the discharge end of said delivery trough section, and said second arm is connected to said receiving trough section, and in which said first arm in all of its positions extends at least in some measure across said receiving trough section.

25. The combination defined in claim 18 in which said first arm is pivotally connected to and supports the discharge end of said delivery trough section, and said second arm is connected to and supported in part by said receiving trough section, and in which said first arm in all of its positions extends at least in some measure across said receiving trough section.

CHARLES NEWTON BEBINGER.

References Cited in the file of this patent

UNITED STATES PATENTS

| Number | Name | Date |
|---|---|---|
| 1,004,186 | Norton | Sept. 26, 1911 |
| 2,032,599 | Sloane | Mar. 3, 1936 |
| 2,270,778 | Bebinger | Jan. 20, 1942 |
| 2,314,009 | McCarthy | Mar. 16, 1943 |
| 2,332,176 | Sloane | Oct. 19, 1943 |
| 2,446,965 | Sweeten | Aug. 10, 1948 |